June 30, 1931.  A. J. SMITH  1,812,835
PIPE COUPLING
Filed Oct. 22, 1928  2 Sheets-Sheet 1
Fig.1.
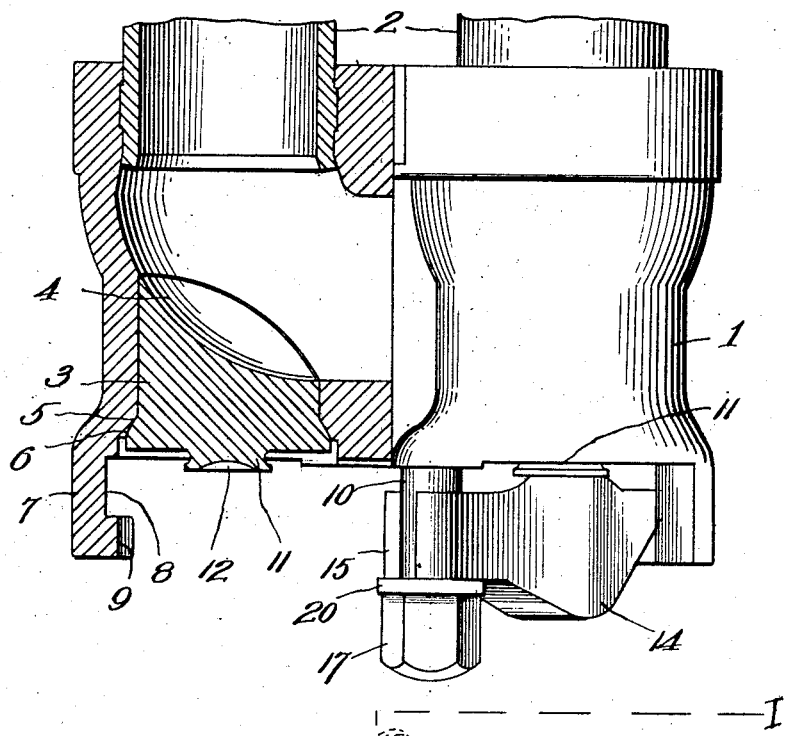
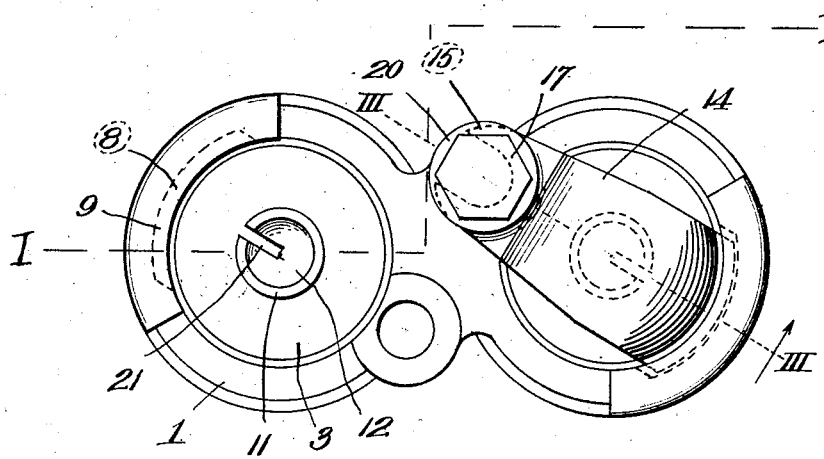
Fig.2.
INVENTOR.
Arthur J Smith
BY
ATTORNEYS.

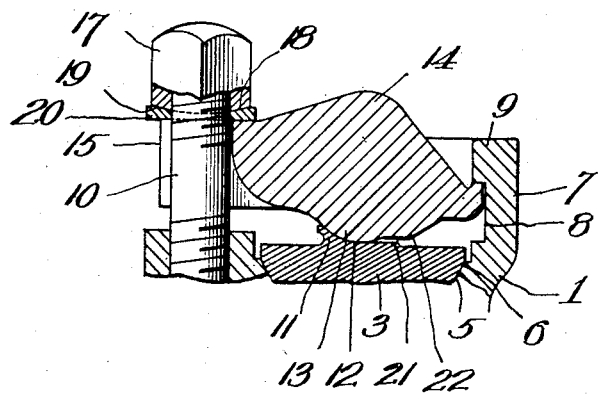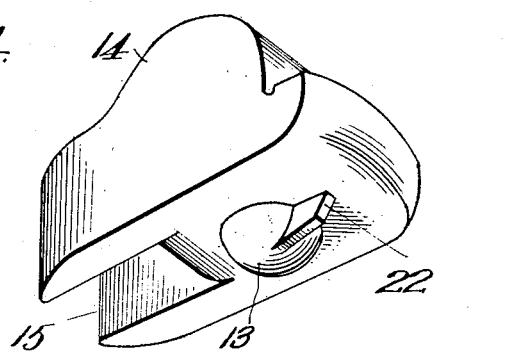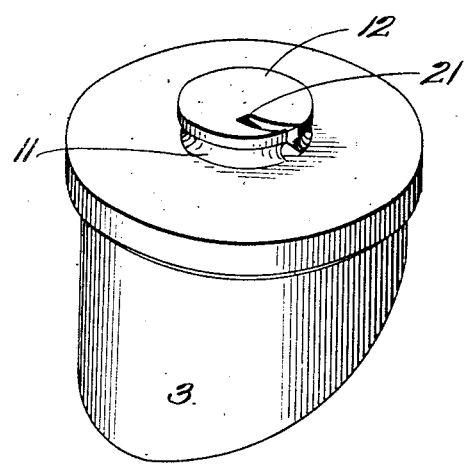

Patented June 30, 1931

1,812,835

UNITED STATES PATENT OFFICE

ARTHUR J. SMITH, OF KANSAS CITY, MISSOURI, ASSIGNOR TO SMITH ENGINEERING COMPANY, OF KANSAS CITY, MISSOURI, A CORPORATION OF MISSOURI

PIPE COUPLING

Application filed October 22, 1928. Serial No. 314,086.

This invention relates to clamp type pipe couplings and has for one of its objects to produce a plug which may be utilized as a part of an elbow or return bend to give access for cleaning and which cannot be dislocated or blown out by pressure inside the fitting even should the holding nut upon the bolt become loosened and in which the clamping force tending to hold the plug in position shall be greater on a certain lug or securing means integrally formed with the fitting than on the clamping bolt.

A further object of the invention is to produce a construction in which the plug is held in accurate position by a key or guide formed on the clamping lug, this being of special advantage where the plug is used to form a bend or turn and therefore has its interior face cut to form a stream line with balance of the body of the fitting.

Another object of the invention is to produce rounded or ball and socket contact faces between the members of the plug and clamping lug whereby the former shall be centered; and to provide circular cross sectional areas throughout rather than flat areas to increase the ultimate bursting strength of the fitting, and to reduce friction or pressure drop.

A still further object is to produce a return bend provided with plugs in alinement with each of the connected pipes providing for the easy interior cleaning of said pipes.

It is to be pointed out that the plug construction of the invention is useful not only in the production of return bends as shown in the drawings, but may cooperate in producing right angle bends, or even if desired may be a plug for the end of a straight pipe section or a clean out opening.

Another object is to utilize in combination with the other features of the invention a closed end or capped nut which will be packed with lubricant, preferably grease and graphite whereby the nut shall be copiously lubricated and therefore easily removable under high temperature service conditions.

With the general objects named in view, and others as will hereinafter appear, the invention consists in certain novel and useful features of construction and organization of parts as hereinafter described and claimed; and in order that it may be fully understood, reference is to be had to the accompanying drawings, in which:

Figure 1 is a top plan view of a return bend equipped with a plug embodying the invention, one half of said device being in central horizontal section on the line I—I of Figure 2.

Figure 2 is an end elevation of the return bend as shown in Figure 1.

Figure 3 is a section on the line III—III of Figure 2.

Figure 4 is a perspective view of the plug.

Figure 5 is a perspective view of the clamping lug.

In the said drawings, where like reference characters identify corresponding parts in all of the figures, the clamping plug of the invention being illustrated as forming a part of a return bend and being therefore in duplicate, 1 indicates the fitting or body of a return bend, said body being formed with a pair of parallel openings in which the ends of a pair of parallel pipes 2 are rolled as illustrated in Figure 1 to hold the pipes in position as common in the art. The body 1 is provided with a cross passageway, and in substantial alinement with the pipes 2 is provided with a pair of parallel openings closed by removable plugs 3 having their inner faces 4 cut to form a stream line with the passageway in the body 1, said plugs to form leak-proof joints, each having a bevelled ground face 5 fitted on a corresponding seat 6 formed in the body 1.

The body 1 is continued throughout a portion of its periphery beyond the plug seat 5 to form an upstanding wall 7 which is undercut as at 8 to form a clamping flange 9. Diametrically opposite the wall 7 said body is tapped for the reception of stud bolts 10, the return bend construction illustrated having the parts described in duplicate and being so proportioned that the stud bolts 10 are respectively above and below the center line of the body to give free access to the clamping nuts hereinafter mentioned.

The plugs are each externally formed with an upstanding axially alined stud 11 having a concave face 12 adapted to receive the rounded convex face 13 formed on its cooperating clamping lug 14, each of said lugs having one of its ends received below the flange 9 of the wall 7 and its other ends bifurcated as at 15 to receive the respective stud bolt 10. Clamping pressure is applied by a clamp nut 17 having a convex face 18 received within a correspondingly concave face 19 in a clamping washer 20, it being here noted that the lever arm between the center line of the lug 14 and the bolt 10 is greater than between said line and flange 9 so that the greatest strain is placed on the latter forming an integral part of the body. It will also be noted that the nut 17 has a closed head in which a lubricant, such as grease and graphite, is packed for the copious lubrication of the nut to the end that it shall be readily removable under high temperature conditions. It will be evident that as the nut 17 is screwed upon the bolt, the lug 14 will rock on its rounded seat to clamp its cooperating plug 3 in position on the seat 6 of the body 1.

When the plug 14 is formed with a stream line face, it is of course necessary to aline and retain said face in position with the cross passage of the body. To accurately aline the plug, the stud 11 on the plug 3 is formed with a key or guide slot 21 which is adapted to receive a key 22 projecting from the face of the lug 14 (see Figure 3). The interlocking slot and key are in the vertical plane of the rocking movement of the lug so that they shall not interfere with the proper operation of the parts. With this construction, it will be apparent that when the key 22 has been fitted in the slot 21 of the plug and the lug has been rotated to receive the bolt 10 between its bifurcated portion 15, the plug will have been automatically alined with the interior of the bend as the stream line face 4 of the plug of course bears a predetermined relation to the passageway in the body and the position of the locking lug 14.

It is believed the operation of the device has been so described that recapitulation is unnecessary. From the above description it will be apparent that I have produced a plug provided with ball and socket points of contact whereby centering of the plug and contact faces is positively assured and one in which the plug is so guided that its stream line face cannot become accidentally thrown out of alinement with the interior passageway of a pipe fitting. It will also be evident that the construction of the invention provides circular cross sectional areas to increase the ultimate bursting strength of the clamp lug, and that a return bend constructed in accordance with the disclosure permits of easy access to the pipes for cleaning or for any other purpose, and due to its interior curvature materially reduces friction or pressure drop.

From the above description it will be evident that I have produced a device embodying the features of advantage set forth as desirable in the statement of the objects of the invention and which is susceptible of modification in minor particulars without departing from the principle of construction and mode of operation involved or from the spirit and scope of the appended claims.

I claim:

1. The combination with a body member having an opening, of a plug fitted in said opening, a clamping flange carried by said body, a clamping lug for exerting pressure on said plug and having one end cooperating with said flange, guiding means interlocking said lug and plug and preventing independent rotation of the latter, and means carried by the body for clamping the other end of said lug.

2. A return bend header for fluid pressure systems comprising a body member having a pair of pipe-receiving openings at one side and a pair of hand-holes alined with the pipe openings at its other side, plugs fitted in each of said hand-hole openings, clamping flanges carried by said body, clamping lugs having ball-and-socket engagement with said plugs and being interlocked with the plugs to prevent independent rotation of the plugs or the lugs, each lug having one end cooperating with said flanges, and means carried by said body for clamping the other ends of said lugs.

3. The combination with a body member having an opening, of a plug fitted in said opening, a clamping flange carried by said body, a clamping lug having a ball-and-socket engagement with said plug and having one end cooperating with said flange, guiding means interlocking said plug and lug, and means carried by the body for clamping the other end of said lug.

4. The combination with a body member having an opening, of a plug fitted in said opening, a clamping flange carried by said body, a clamping lug for exerting pressure on said plug and having one end cooperating with said flange, one of said members having a slot and the other member a key fitted in said slot for positioning and preventing independent rotation of either the plug or the lug, and means carried by the body for clamping the other end of said lug.

5. The combination with a body member having an opening, of a plug fitted in said opening, a clamping flange carried by said body, a clamping lug adapted to exert pressure on said plug and having one end cooperating with said flange and its other end being bifurcated, a clamp bolt carried by said body and extending through the bifurcation in the lug, means on said bolt for exerting clamping pressure on the lug, and guiding means interlocking said lug and plug and preventing independent rotation of the latter.

6. The combination with a body member having an opening, of a plug fitted in said opening, a clamping flange carried by said body, a clamping lug having a ball-and-socket seat on said plug and having one end cooperating with said flange and its other end being bifurcated, a clamp bolt carried by said body and extending through the bifurcation in the lug, and guiding means interlocking said lug and plug.

7. The combination with a body member having an opening, of a plug fitted in said opening, a clamping flange carried by said body, a clamping lug adapted to exert pressure on said plug and having one end cooperating with said flange and its other end bifurcated, the plug and lug having an interlocking key and slot for positioning and preventing independent rotation of either the plug or the lug, a clamp bolt carried by the body and extending through the bifurcation in the lug, and means on said bolt for exerting clamping pressure on the lug.

8. The combination with a body member having an opening, of a plug fitted in said opening, a clamping flange carried by said body, a clamping lug adapted to exert pressure on said plug and having one end cooperating with said flange and its other end bifurcated, the plug and lug having an interlocking key and slot for positioning the plug and the lug, a clamp bolt carried by the body and extending through the bifurcation in the lug, a clamping washer on the bolt in abutment with said lug and having a rocker face, and a clamp nut having a corresponding rocker face in abutment with said washer.

9. The combination with a body member having an opening, of a plug fitted in said opening, a member detachably engaged with said body member and being adapted to apply force on and being interlocked with the plug to prevent independent rotation thereof and to retain same in the body opening, and means for applying force on said clamping member to hold the plug in position.

10. A pipe bend comprising a body member having its internal face of arcuate form and having an opening extending to the exterior of the body through said arcuate portion, a plug fitted in said opening and having its inner end of arcuate form to correspond with the arcuate form of the internal face of the body member, a member detachably engaged with the body member and being adapted to apply force on and being interlocked with the plug to prevent independent rotation thereof and to retain same in the opening, and means for applying force on said clamping member.

In testimony whereof I affix my signature.

ARTHUR J. SMITH.